US011314247B2

(12) United States Patent
Biehler et al.

(10) Patent No.: US 11,314,247 B2
(45) Date of Patent: Apr. 26, 2022

(54) METHOD AND SYSTEM FOR REMOTELY CONTROLLING A VEHICLE

(71) Applicant: Continental Automotive GmbH, Hannover (DE)

(72) Inventors: Martin Biehler, Kuemmersbruck (DE); Bardo Peters, Landshut (DE); Mario Geigenfeind, Burglengenfeld (DE)

(73) Assignee: Continental Automotive GmbH, Hannover (DE)

(*) Notice: Subject to any disclaimer, the term of this patent is extended or adjusted under 35 U.S.C. 154(b) by 238 days.

(21) Appl. No.: 16/489,502

(22) PCT Filed: Jul. 30, 2018

(86) PCT No.: PCT/DE2018/200070
§ 371 (c)(1),
(2) Date: Aug. 28, 2019

(87) PCT Pub. No.: WO2019/024963
PCT Pub. Date: Feb. 7, 2019

(65) Prior Publication Data
US 2020/0004240 A1 Jan. 2, 2020

(30) Foreign Application Priority Data
Aug. 1, 2017 (DE) ............ 10 2017 213 204.3

(51) Int. Cl.
*G05D 1/00* (2006.01)
*G05D 1/02* (2020.01)

(52) U.S. Cl.
CPC ......... *G05D 1/0038* (2013.01); *G05D 1/0016* (2013.01); *G05D 1/0212* (2013.01); *G05D 2201/0213* (2013.01)

(58) Field of Classification Search
CPC .. G05D 1/0038; G05D 1/0016; G05D 1/0212; G05D 2201/0213
See application file for complete search history.

(56) References Cited

U.S. PATENT DOCUMENTS 9,568,995 B1    2/2017 Lian
2012/0101660 A1    4/2012 Hattori
(Continued)

FOREIGN PATENT DOCUMENTS

DE    101 20 511    6/2002
DE    102012014991    2/2013
(Continued)

OTHER PUBLICATIONS

English translation of the International Search Report of the International Searching Authority for International Application PCT/DE2018/200070, dated Nov. 27, 2018, 3 pages, European Patent Office, HV Rijswijk, Netherlands.
(Continued)

*Primary Examiner* — Jess Whittington
*Assistant Examiner* — Brian E Yang
(74) *Attorney, Agent, or Firm* — W. F. Fasse

(57) ABSTRACT

A method of remotely controlling a vehicle involves creating an exterior situation image for the vehicle (1) using a sensor system (2) for detecting the surroundings of the vehicle. A trajectory of the vehicle is specified by a driver assistance system (3) of the vehicle. The exterior situation image and the trajectory are transmitted wirelessly to a remote control (7) that is arranged spatially separately from the vehicle. The vehicle is controlled by the remote control based on the trajectory and the exterior situation image.

12 Claims, 6 Drawing Sheets

(56) References Cited

U.S. PATENT DOCUMENTS

| | | | |
|---|---|---|---|
| 2014/0207535 A1 | 7/2014 | Stefan et al. | |
| 2016/0327950 A1 | 11/2016 | Bachrach et al. | |
| 2017/0069214 A1* | 3/2017 | Dupray | G08G 5/0013 |
| 2017/0166207 A1 | 6/2017 | Darms et al. | |
| 2017/0192423 A1* | 7/2017 | Rust | G01C 21/3492 |
| 2018/0208211 A1* | 7/2018 | Chiba | B60W 50/08 |
| 2018/0231982 A1* | 8/2018 | Yunoki | G05D 1/0282 |

FOREIGN PATENT DOCUMENTS

| | | |
|---|---|---|
| DE | 102014018108 | 6/2016 |
| DE | 102015015833 | 6/2017 |
| DE | 102015225241 | 6/2017 |
| EP | 2 762 988 | 8/2014 |
| WO | WO 2017/071143 | 5/2017 |

OTHER PUBLICATIONS

PCT International Preliminary Report on Patentability including English Translation of PCT Written Opinion of the International Searching Authority for International Application PCT/DE2018/200070, dated Feb. 4, 2020, 7 pages, International Bureau of WIPO, Geneva, Switzerland.

German Search Report for German Patent Application No. 10 2017 213 204.3, dated May 15, 2018, 9 pages, German Patent and Trademark Office, Muenchen, Germany, with partial English translation, 7 pages.

\* cited by examiner

METHOD AND SYSTEM FOR REMOTELY CONTROLLING A VEHICLE

FIELD OF THE INVENTION

The invention relates to a method and a system for remotely controlling a vehicle.

BACKGROUND INFORMATION

Automotive manufacturers are beginning to announce vehicles which are intended in future to be fully self-driving. This offers completely new possibilities in the areas of mobility, comfort and service. However, for substantially automated vehicles, a person who is fit to drive will continue to be a prerequisite, so that they can intervene as soon as the system for controlling the vehicle reaches its limits. In particular, a driver may begin to suffer from health problems during a journey and become unexpectedly unfit to drive. To solve this problem, it is known to independently bring the vehicle into a safe state or to decelerate in a controlled manner, without putting other road users at risk.

Furthermore, in particular truck and bus drivers are obligated to take breaks, e.g. 45 minutes after 4.5 hours, and said drivers are further not permitted to drive their vehicle for longer than a set maximum driving time, e.g. 9 hours per day. If, e.g. a consignment has to be transported over a relatively long distance, this may take several days or require a second driver. Currently, a driver who is no longer fit to drive typically leaves their parked vehicle and for example takes a taxi or public transport. In this case, the vehicle has to be collected again from the place where it was left. This costs money and takes time.

Furthermore, system restrictions may also arise in future which stand in the way of completely automated driving on all roads and under all circumstances. Such restrictions may for example include weather conditions, side roads, dirt roads or the like.

SUMMARY OF THE INVENTION

It is an object of embodiments of the present invention to provide a method and a system which can overcome the above-stated disadvantages.

The above object can be achieved by the method and the system according to embodiments of the invention as set forth herein. The present invention makes it possible, as will be explained in greater detail below, to achieve monitoring and intervention in control of the vehicle in an emergency situation using remote control. It additionally makes it possible for the vehicle to be controlled completely by remote control in the event of system failure or if a system limit is exceeded.

According to a first aspect of the invention, a method is provided for remotely controlling a vehicle. The vehicle is in particular a motor vehicle, for example an automobile in the form of a private car, a truck, a bus, a utility vehicle or a motorcycle, a quad bike or a three-wheeled vehicle. The method comprises creating an exterior situation image for a vehicle using a sensor system for detecting the surroundings of the vehicle. Furthermore, a trajectory of the vehicle is specified by means of a driver assistance system of the vehicle, and the exterior situation image and the trajectory are transmitted wirelessly to a remote control of the vehicle, wherein the remote control is arranged spatially separately from the vehicle. Furthermore, the vehicle is controlled by means of the remote control on the basis of the received trajectory and the received exterior situation image.

Moreover, an interior of the motor vehicle may be monitored, for example using sensors such as interior cameras designed for that purpose. Such interior monitoring may supply an interior situation image for the motor vehicle. The interior situation image may for example include information about the occupants and their state (of health) and/or activities. The sensors may for example detect how attentive the driver of the vehicle is, or whether the occupants are wearing seat belts.

Control of the vehicle by means of the remote control may be based not only on the received trajectory and the received exterior situation image but also on the interior situation image, which may likewise be transmitted wirelessly to the remote control. It may in particular be derived from the interior situation image whether or not the driver of the vehicle is fit to drive (for example if the driver falls ill suddenly, or has fallen asleep). If the driver is unfit to drive, a takeover request may be generated automatically to the remote control, such that control of the motor vehicle may be transferred to the remote control in order in this way in particular to avoid an accident and/or for example to steer the motor vehicle to the nearest hospital using the remote control.

The sensor system may for example comprise a camera system, in particular a surround view system with a front camera, a reversing camera and side cameras, wherein the surround view system may in particular produce a 360° all-round view of the vehicle, as part of the exterior situation image thereof, and corresponding data, which may be transmitted to the remote control. Furthermore, the sensor system for producing the exterior situation image for the vehicle may in particular have a radar sensor, a laser sensor, a navigation system or a LiDAR sensor. A telephone link to a driver and further occupants of the vehicle may likewise be provided but does not however necessarily have to be active.

The vehicle trajectory may be a NOMINAL path, which describes a desired path which the vehicle is intended to take in order to arrive at a specified geographical destination. The NOMINAL path may in this case be composed of a plurality of individual positions. In particular, the vehicle trajectory may be the NOMINAL path located in the immediate surroundings of the vehicle and which may be represented in the situation image. To specify the vehicle trajectory, the driver assistance system may for example make use of data from a navigation system. In particular, the navigation system may continuously determine a current vehicle position and provide corresponding data to the driver assistance system. Furthermore, the navigation system may provide the driver assistance system with route directions, wherein the route directions include a continuously updated specified path between the current position of the vehicle and a specified geographical destination position. On the basis, in particular, of the route directions obtained from the navigation system, the driver assistance system may specify a trajectory for the vehicle which corresponds with the route directions in such a way that the specified destination position is safely reached. The feature "safely reached" may in this connection in particular be understood to mean that as safe as possible a trajectory is selected, wherein hazardous traffic situations and accidents are avoided.

The driver assistance system may furthermore be designed to control the vehicle in such a way that the vehicle autonomously follows the specified trajectory. The driver assistance system may in this connection in particular be designed to control a steering system, a braking system and a drive system of the vehicle as a function of the specified trajectory. This makes it possible for the vehicle on the one hand to be driven by means of the driver assistance system in an autonomous driving mode, wherein a driver inside the vehicle does not have to intervene in control of the vehicle. On the other hand, it is moreover possible for the vehicle to be driven by means of the remote control in a remotely controlled driving mode, wherein the driver inside the vehicle likewise does not have to intervene in control of the vehicle since this may in particular be effected by an operator of the remote control.

The present invention thus proposes a type of "chauffeur", which may remotely monitor and control the vehicle, in particular a highly automated private car, a bus or a truck. This chauffeur function may in particular be fulfilled by controlling the vehicle using the remote control, in particular by an operator of the remote control, on the basis of the received trajectory and the received exterior situation image. The remote control or the operator thereof may in particular be provided with information about all relevant driving data, images of the passenger compartment (interior situation image), if available, navigation data and vehicle data. The remote control operator may thus remotely observe live images produced in particular by the sensor system, into which images the specified vehicle trajectory may be inserted in order in this way to be able to monitor the vehicle in the best possible way.

Implementation of this chauffeur function is already possible as a supplement to highly automated SAE Level 4. The chauffeur function may serve as an additional safety level if the driver assistance system and/or the driver of the vehicle is not available for the driving task. This could for example also include the "end of use case" for the automated driving system. The present invention means that there is no longer a need for any occupant in highly automated vehicles to be fit to drive, since monitoring and control of the vehicle is possible remotely.

The present invention thus enables vehicle monitoring and vehicle control remotely at any time, in particular with the assistance of the vehicle sensor system, maps and other environment data. The chauffeur function may be flexibly ordered or requested without start-up time or start-up costs. For example, the driver assistance system of the vehicle may transmit a hand-over request to the remote control, wherein the hand-over request may be indicated by a driver of the vehicle or generated automatically by the driver assistance system.

It is thus possible even for individuals who have suddenly become unfit to drive not to have to leave their vehicle standing. In the commercial field, a company will be able to make significant financial savings if a consignment arrives more quickly at its destination, since a truck may for example continue to be monitored and controlled during statutory breaks remotely by another person. The driver of the vehicle may take their prescribed break at this time, since they do not themselves have to control and monitor their vehicle.

Remote control of the vehicle is possible in particular via an operating element, for example a steering wheel, or via marking out of a desired route, as will be explained in greater detail below. Provision may in this case in particular be made for sudden intervention by the driver or other occupants of the vehicle to be possible only to a limited degree during remote control of the vehicle. In the event of danger, however, it is always ensured that the occupant or driver of the vehicle can intervene in control of the motor vehicle.

It is thus provided, according to one embodiment, that the vehicle is controlled by means of an operating element of the remote control. An operator of the remote control may for example actuate the operating element of the remote control. This actuation may be detected by the remote control, and the remote control may remotely control the vehicle on the basis of the detected actuation of the operating element.

The operating element may in particular comprise a steering wheel. Furthermore, the operating element may comprise a brake pedal and a gas pedal. Furthermore, the operating element may also comprise a manual control, for example a keyboard etc. A clutch pedal may also constitute part of the operating element, provided the vehicle which is to be remote-controlled by means of the remote control is a vehicle with non-automatic clutch transmission. In addition, the operating element may for example further comprise an actuating element for a direction indicator, a vehicle light or a windshield wiper. Automatic direction indication when turning off could also be conceivable. In principle, all the operating elements of the motor vehicle may be replicated in the remote control.

The remote control may in particular be designed to detect actuation of the operating element and generate corresponding control data and transmit the control data to the driver assistance system of the vehicle. The driver assistance system may in turn be designed to control the vehicle on the basis of the control data received from the remote control. The remote control may for example detect actuation of a steering wheel of the operating element (in particular by an operator of the remote control) of the remote control, and transmit corresponding steering data to the driver assistance system of the vehicle. The driver assistance system may then for example control a steering system of the vehicle on the basis of the steering data received from the remote control, in such a way that the vehicle is steered in accordance with actuation of the steering wheel of the remote control. The same is true in particular of actuation of a gas pedal, a clutch pedal and a brake pedal.

One starting point for the present invention is a highly automated vehicle with a continuous data link, wherein, by means of the sensor system, a collision risk may be identified and for example steering, deceleration or acceleration may be initiated by the driver assistance system and/or the remote control in order to prevent said collision. Such a vehicle should be able to drive independently to its destination if there is nothing out of the ordinary between the vehicle and the destination.

In those few cases in which the vehicle or the driver assistance system thereof reaches its limits, the remote control may intervene to enable safe continued driving. Such cases may arise for example due to a confusing road layout or junctions, or due to temporary signage resulting from construction works (for example if loose chippings have to be driven over or if only barrier tape is serving as road markings). Furthermore, such a situation may arise if the vehicle driver suddenly falls ill and is unable to continue driving and a trip to hospital becomes necessary, for example. The remote control may additionally need to intervene if dirt roads, fields or parking lots have to be driven over, or in the event of driving through a covering of mud or snow concealing the lines on the carriageway.

A highly automated vehicle, which is intended to arrive independently and autonomously at its destination, should determine the future path on the basis of navigation information and maps, so as to be able to give control commands in particular to the steering. The driver assistance system has consequently to determine a path or a line which is followed.

The waypoints/absolute coordinates forming a line and lying in the near future (in the camera image) may be sent remotely to the remote control.

In particular, a user of the remote control may monitor the situation image from the sensor system, for example the camera image, and the plotted waypoints. If the vehicle then reaches its limits owing to one of the above-stated situations, provision may be made for new waypoints or coordinates to be plotted manually by the user of the remote control in order to keep the situation safely and as well as possible under control (marking out of a desired route or trajectory).

In this respect, provision is alternatively or additionally made according to a further embodiment for the trajectory to be corrected by means of the remote control, in particular if the remote control or the user thereof identifies, on the basis of the situation image, that a safer trajectory exists than the trajectory specified by the driver assistance system, wherein the vehicle is controlled by means of the remote control on the basis of the corrected trajectory and the received exterior situation image. In addition to the exterior situation image and, if present, the interior situation image, all data which are used for self-positioning, such as for example steering angle, wheel speed and rates of rotation, may be wirelessly transmitted as well and the motor vehicle may be controlled by means of the remote control on the basis thereof.

Furthermore, provision may be made (as it were in the sense of an event data recorder) for non-volatile memory to be used to store the periods over which the driver has controlled the motor vehicle and by what actions, and the periods over which the motor vehicle has been controlled via the remote control and by what actions. Furthermore, the periods over which the driver assistance system has controlled the motor vehicle and by what actions may also be stored in non-volatile memory. If in particular an accident has arisen, the stored data may be accessed in order to reconstruct how and by whom or what the motor vehicle was being controlled during the accident situation. This may in particular be helpful for answering the question as to who is responsible for an accident situation. The stored data may for example be deleted again after a set period of time has elapsed, provided no accident situation has arisen.

Correction of the trajectory may in particular proceed using the remote control, by plotting the corrected trajectory on a touchscreen. In this case, provision may in particular be made for the camera image to be frozen from the first time the touchscreen is touched, for example with a finger or with a stylus, an updated camera image only being displayed once the finger or stylus is taken off the touchscreen.

It is likewise possible for the user of the remote control remotely to plot the corrected trajectory into a supplementary image of the surroundings of the vehicle, for example into a map, wherein all important information from the sensor system, in particular from a camera system of the vehicle, is additionally also transferred to the supplementary image. In this respect, according to a further embodiment provision is made for a supplementary image of the surroundings of the vehicle to be transmitted to the remote control, wherein the supplementary image is produced in particular by a sensor which is not arranged on the vehicle, and wherein the trajectory is corrected by the remote control on the basis of the situation image and the supplementary image.

As a result of the above-described marking out of the corrected trajectory, any difference between a first ACTUAL path and a second ACTUAL path can be kept particularly small. The first ACTUAL path may deviate from the specified NOMINAL path in particular in a pre-alignment of the vehicle (y direction), since the transmission of data from the sensor system, in particular image transmission, will entail a certain delay, such that the vehicle is always already a certain distance, for example a few meters, further forward than is displayed to the operator of the remote control for example on a screen. The operator of the remote control will consequently start steering already with some delay. Until, however, the currently desired steering angle is transmitted to the vehicle, the vehicle will already be located on the second ACTUAL path or further forward in the y direction by a further difference. By marking out the corrected trajectory, the first ACTUAL path and the second ACTUAL path may move closer together.

Furthermore, the above-described marking out of the corrected trajectory offers the advantage that the steering angle does not always have to be continuously transmitted, but rather that instead points to be driven through located in front of the vehicle may be indicated or transmitted. The driver assistance system within the vehicle and also a remote controller device (for example their PC; decision criteria may if necessary be fixed between vehicle and remote controller (equipment)) may calculate a line from these points, from which the steering angle or steering movements needed may be taken (calculated). The plotting or marking out of the corrected trajectory thus makes it possible for the above-described deviations in the y direction to be kept particularly small.

According to a further embodiment, provision is made for the quality of an available data link between the vehicle on the one hand, in particular between the sensor system and the driver assistance system, and the remote control on the other hand to be determined continuously, and for the vehicle to be controlled using the operating element of the remote control only if the determined quality of the data link reaches a predetermined first quality level. The first quality level may in this respect be selected to be sufficiently high that, when the first quality level is reached, sufficiently fast and reliable data transmission may proceed to ensure reliable control of the vehicle by means of the operating element of the remote control.

The quality of the available data link may in particular be a speed with which data may be transferred. The vehicle may in particular access different available data links (for example mobile radio networks or satellite links) and continuously monitor or determine the quality thereof, in particular the signal strength and stability thereof. In particular, the vehicle may be designed to access the respective best available link. Provision may also be made for "car to X" data from other vehicles to be used, to allow current traffic events, e.g. upcoming obstacles, to be included in the calculation so as in this way better to be able to identify critical traffic situations.

Furthermore, other vehicles or infrastructure components (for example "smart" traffic lights, which may capture what the traffic is doing and determine in what position which vehicle is located relative to the traffic lights), located in the vicinity of the motor vehicle or ego vehicle, could also confirm or correct the position of the motor vehicle to be controlled and relay the information to the remote control or to the "remote controller". This makes it possible, in particular, to check whether a NOMINAL path predetermined by the remote control is being kept to or how far an ACTUAL path of the motor vehicle deviates from the NOMINAL path. A new NOMINAL path may optionally be predetermined by means of the remote control.

For example, the driver assistance system of the vehicle may transmit a hand-over request to the remote control if the determined quality of the data link reaches or exceeds the first quality level. The quality of the available data link may for example be determined by means of a vehicle communication unit set up for the purpose. Provision may additionally be made for information about the quality of an available data link between the vehicle and the remote control to be taken from available network coverage maps.

Provision may furthermore be made for the trajectory to be corrected by means of the remote control only if the determined quality of the data link reaches a predetermined second quality level, wherein the second quality level lies below the first quality level. The above-described marking out of the trajectory may thus proceed even when the quality of the data link is insufficient for control by means of the operating element (for example a steering wheel or a joystick, keyboard etc.), because the described path or corrected trajectory may lie several car lengths in the future.

In particular, network coverage along freeways has high priority. If the present invention is used in particular in trucks and coaches, these may drive for long distances relatively independently using the driver assistance system or the remote control while the driver adheres to their break times. In this context, the present invention makes it possible, in particular, for the above-stated vehicles to be monitored to ensure the safety thereof.

Moreover, provision may be made for control of the vehicle to be handed over from the remote control to the driver assistance system if the determined quality of the data link does not reach the predetermined second quality level.

If the determined quality of the data link lies below the second quality level, it is impossible to ensure that sufficient data for safe control of the vehicle are transmitted to the remote control. In this case, the driver of the vehicle may be requested to take over control of the vehicle. If the driver does not respond, the vehicle may be brought to a standstill by means of the driver assistance system for example at a safe location. An emergency call could for example be made independently from there. In this respect, provision may in particular be made for a hand-over request to a driver of the vehicle to be generated using the driver assistance system after control of the vehicle has been taken over by the driver assistance system, wherein a minimal risk maneuver is performed by the driver assistance system if the driver of the vehicle does not take over control of the vehicle after a set period has elapsed since the hand-over request.

Areas with connection problems (in particular areas in which the quality of the data link does not reach the first quality level and/or the second quality level) may be documented in order in future to avoid these areas as far as possible or to be able to inform the driver of the vehicle earlier if they are fit to drive.

Furthermore, a warning signal may be generated for the driver of the vehicle, for example an acoustic signal, a light signal or a vibration signal, if a possible loss of the data link is identified. In this way, the driver has the option to decide whether the vehicle is brought safely to a standstill, in particular by means of the driver assistance system, or whether the driver themselves would like to take over managing the vehicle.

According to a further embodiment, provision is further made for a communication link to be established between the driver of the vehicle and an operator of the remote control. The communication link may for example be a telephone link or a video link. The communication link may in particular be established by the driver of the vehicle. In this way, the driver and possible further occupants of the vehicle may themselves decide whether they wish to communicate with, in particular speak to, the operator of the remote control. In this way, this embodiment contributes to an increase in privacy for the driver or further occupants of the vehicle, since no stranger is sitting in the vehicle and the operator of the remote control is not situated in the vehicle and a communication link with the driver or the occupants of the vehicle is only produced if they so wish.

According to a second aspect of the invention, a system for remote control of a vehicle is provided. The system comprises a remote control described above in connection with the first aspect of the invention, said remote control being designed in particular to receive from a vehicle an exterior situation image for the vehicle and a specified trajectory for the vehicle, wherein the remote control is arranged spatially separately from the vehicle. Furthermore, the remote control is designed to control the vehicle on the basis of the received trajectory and the received exterior situation image. As far as embodiments, effects and advantages of the system according to the second aspect of the invention are concerned, reference is made in particular to the above explanations in connection with the method according to the first aspect of the invention and to the following description of figures in order to avoid repetition.

BRIEF DESCRIPTION OF THE DRAWINGS

Exemplary embodiments of the invention are explained in greater detail below with reference to schematic drawings, in which.

DETAILED DESCRIPTION OF EXAMPLE EMBODIMENTS OF THE INVENTION

Figure 1:
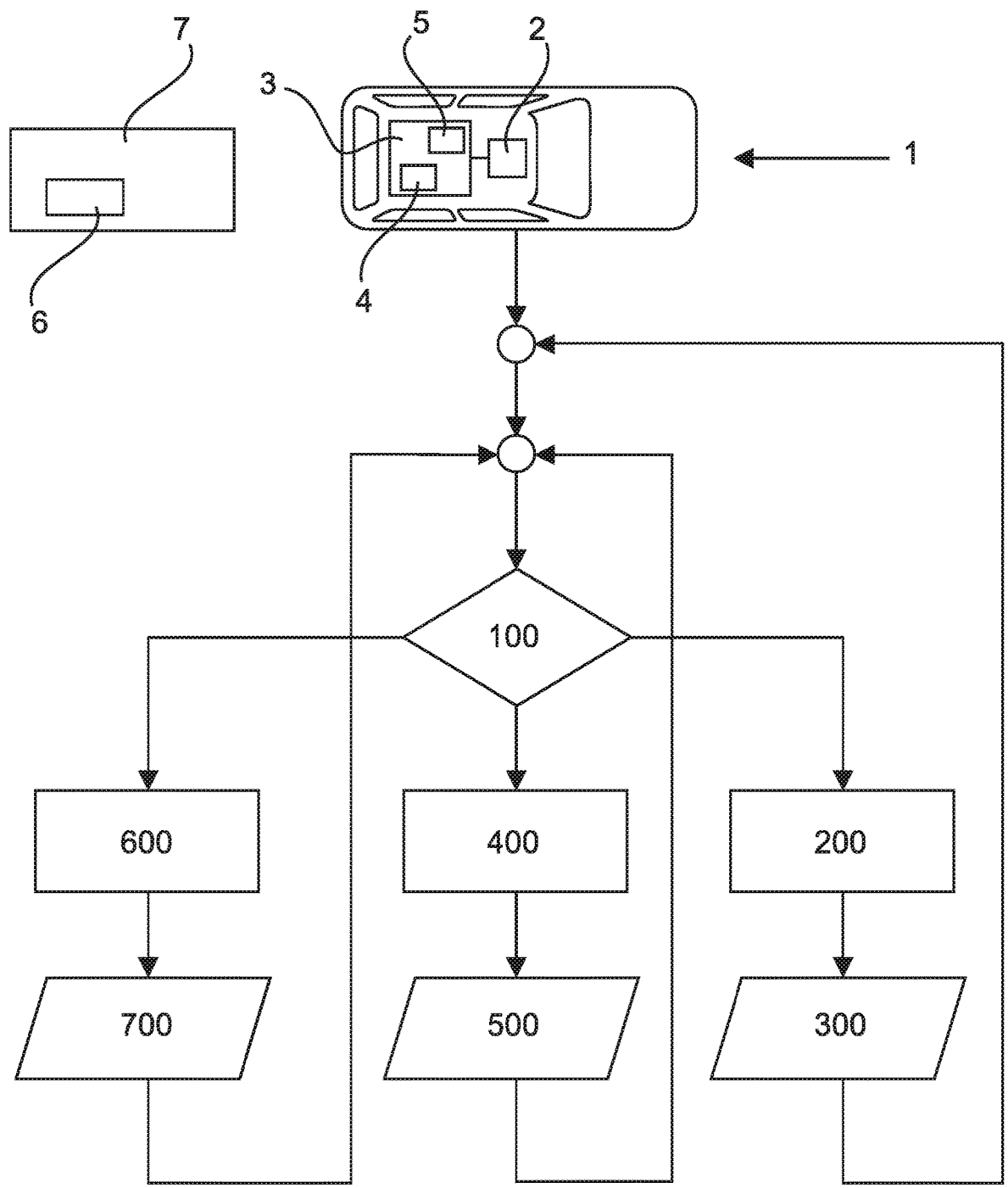
FIG. 1 is a decision diagram for performing an exemplary embodiment of a method according to the present invention.
Figure 2:
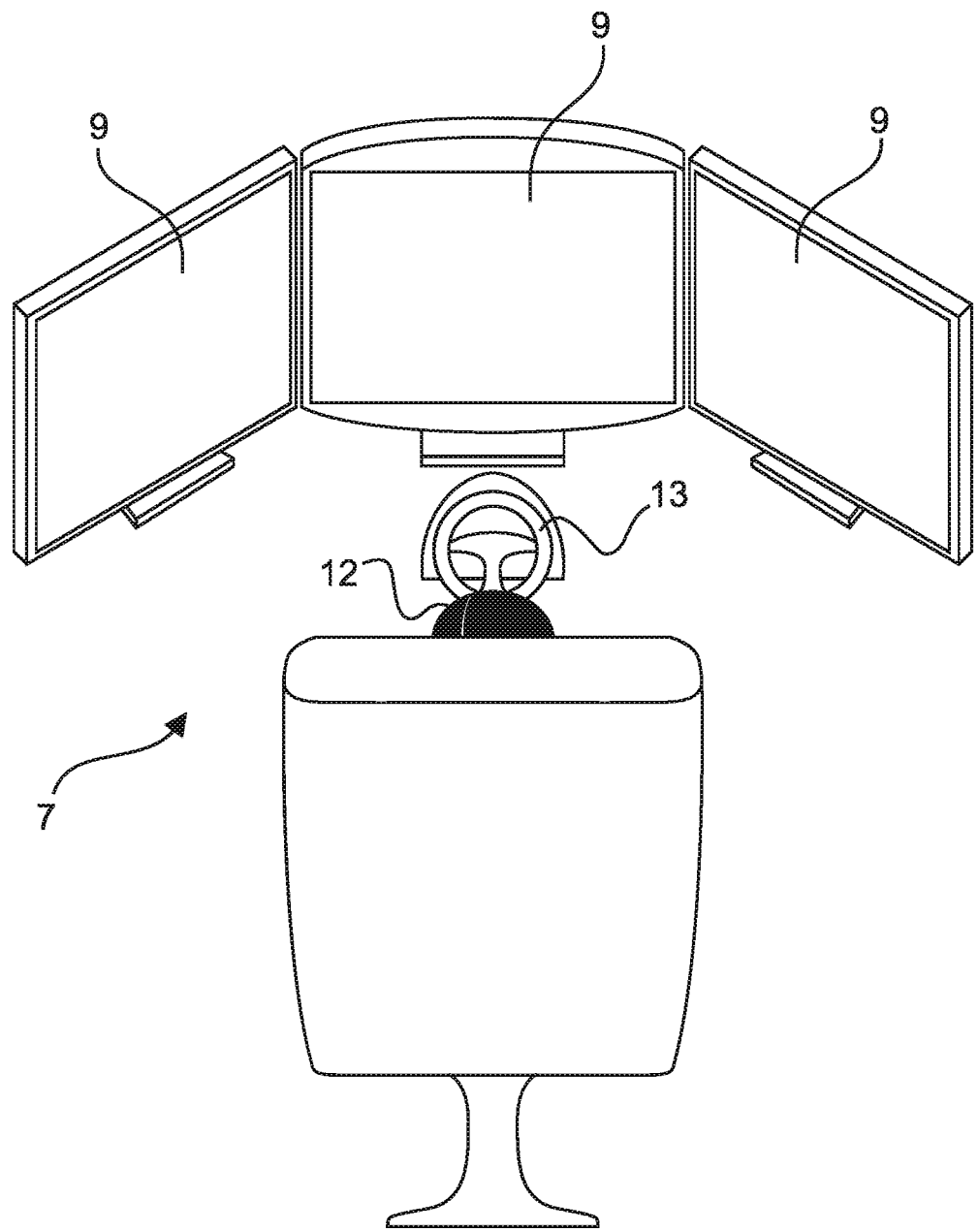
FIG. 2 is a perspective view of a remote control in one exemplary embodiment of a system for remote control of a vehicle according to the present invention.

FIG. 1 shows a highly automated vehicle 1 (e.g. a private car, which is capable of driving autonomously), comprising a sensor system 2, e.g. a surround view system with a plurality of cameras for producing a situation image in the form of an all-round image of the exterior surroundings of the vehicle 1. The vehicle 1 further comprises a driver assistance system 3, which is connected for communication with the sensor system 2. The driver assistance system 3 comprises a navigation system 4 and a first communication interface 5 for exchanging data with a second communication interface 6 of a remote control 7 for remote control of the vehicle 1, wherein the remote control 7 is arranged geographically separately from the vehicle 1. FIG. 2 shows how the remote control 7 may be equipped in detail.

Figure 4:
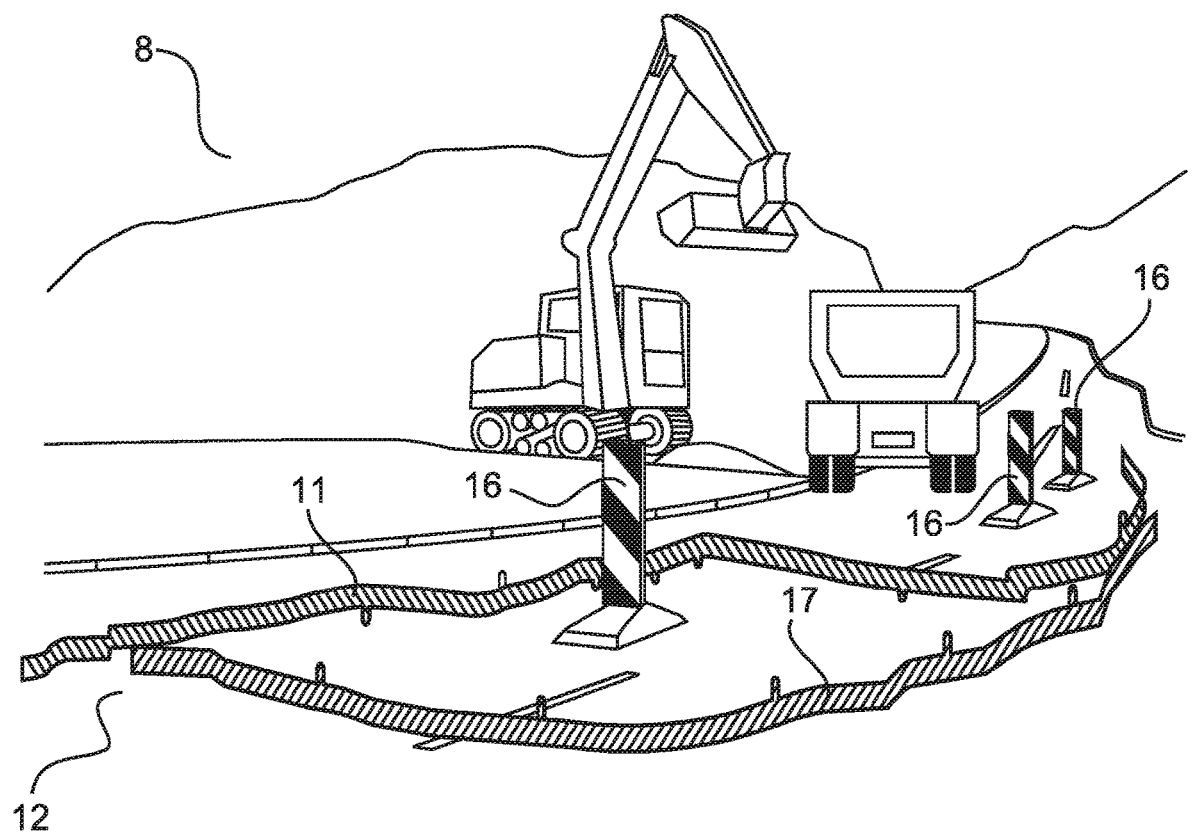
FIG. 4 shows an image from a camera of a vehicle with plotted, predetermined NOMINAL path and corrected NOMINAL path.
Figure 5:
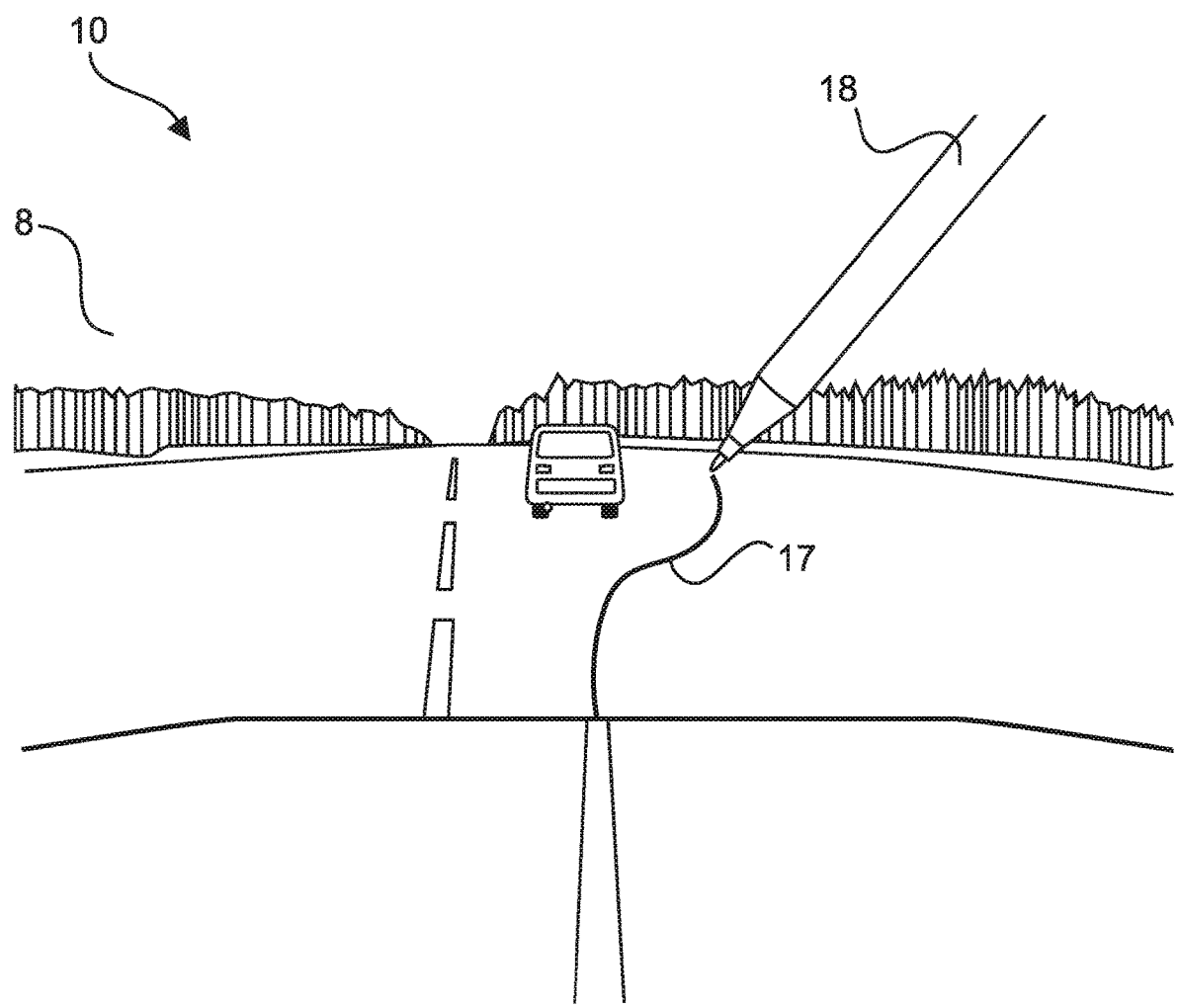
FIG. 5 shows an image of a camera of a vehicle on a touchscreen with plotted, corrected NOMINAL path and a stylus for drawing on the touchscreen

An exterior situation image 8 for the vehicle 1 is created by means of the sensor system 2. Examples of such a situation image 8 are shown in FIGS. 4 and 5. The situation image 8 is transmitted wirelessly via the communication interface 5 of the driver assistance system 3 to the second communication interface 6 of the remote control 7, for example via a mobile radio network or a satellite network. The remote control 7 may comprise one or more monitors 9 (cf. FIG. 2) or touchscreens 10 (FIGS. 5 and 6), on which the situation image 8 may in each case be displayed.

Figure 3:
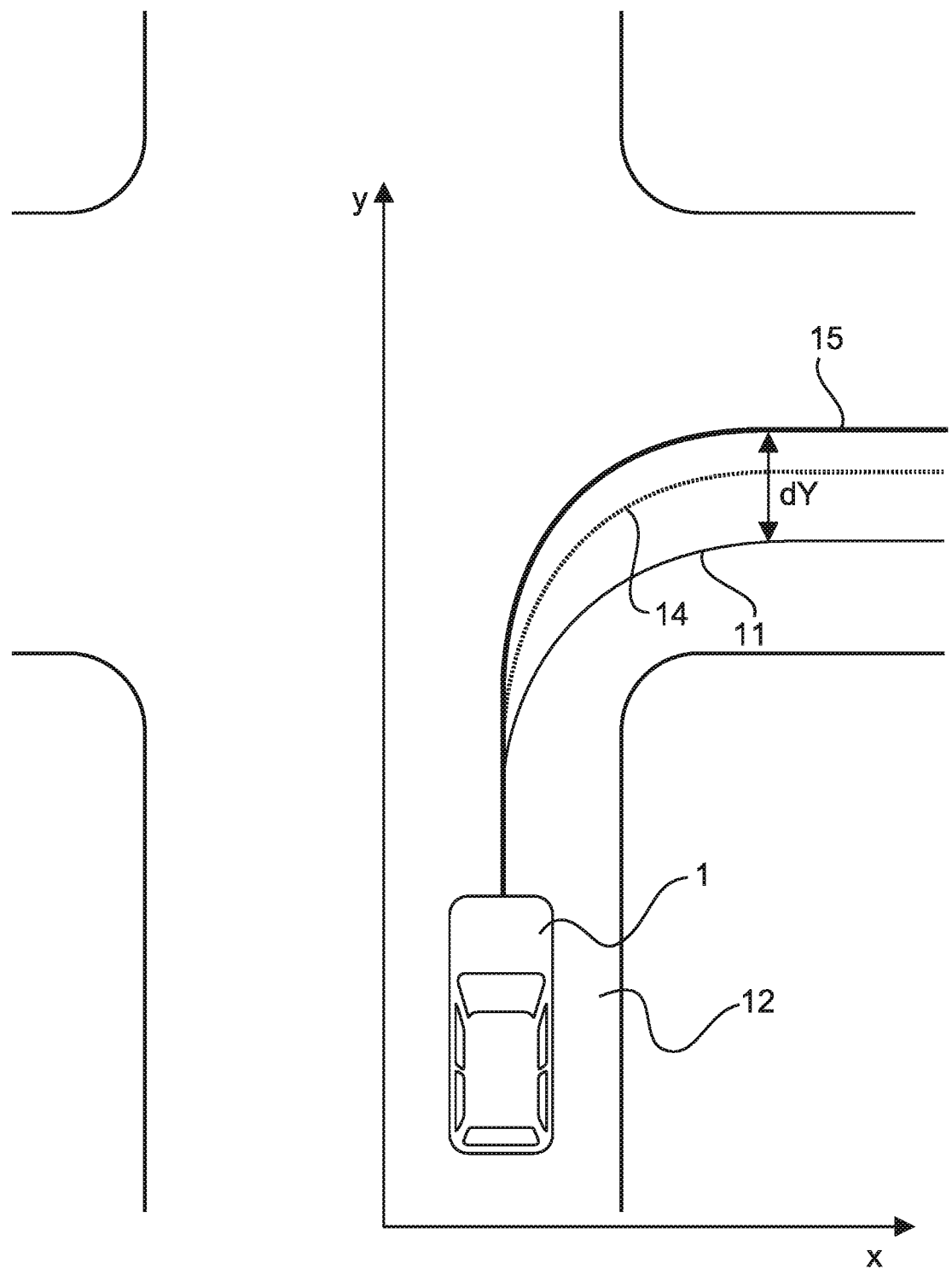
FIG. 3 is a plan view onto a vehicle on a road and depicts one NOMINAL path and two ACTUAL paths.

Using the navigation system 4, the driver assistance system 3 further specifies a trajectory for the vehicle 1, shown in the exemplary embodiment in the form of a NOMINAL path 11 (cf. FIG. 3). The NOMINAL path 11 as the specified trajectory is also transmitted wirelessly to the second communication interface 6 of the remote control 7 via the communication interface 5 of the driver assistance system 3, e.g. via a mobile radio network or a satellite network. The vehicle 1 may then be controlled by means of the remote control 7 on the basis of the specified trajectory representing the NOMINAL path 11 and the exterior situation image 8 that have been received by the remote control.

The vehicle 1 is moving on a road 12. In this case, the NOMINAL path 11 here describes a desired path, i.e. the specified trajectory, which the vehicle 1 should take to reach a specified destination. Since, however, transmission of the image data from the camera system as the sensor system 2 involves a certain delay, the vehicle 1 is always already on a first ACTUAL path 14 (as shown in FIG. 3), which is a few meters further forward in the y direction (in particular the straight-ahead direction of the vehicle 1) than is displayed for example on the monitor 9 to an operator 12 of an operating element in the form of a steering wheel 13 of the remote control 7.

The operator 12 of the steering wheel 13 consequently initiates steering with some delay. However, by the time the currently desired steering angle has been transmitted to the vehicle 1, the vehicle 1 is already on a second ACTUAL path 15 or already further forward by dY.

The difference dY, which arises through the latency or delay due to data transmission from the vehicle 1 to the remote control 7 and back, may be relatively readily calculated. For example, if the vehicle 1 is traveling at a speed of 50 km/h (13.9 m/s) a latency arises for data transmission (round trip) of 2×80 ms=160 ms which corresponds to a distance (dY) of 2.2 m traveled by the vehicle 1 in this period. If the vehicle 1 is traveling at a speed of 30 km/h (8.3 m/s), and the latency of 160 ms is the same, a distance of 1.3 m is for example traveled by the vehicle 1 in this period. If the vehicle 1 is traveling at a speed of for example 100 km/h (27.7 m/s), and the latency of 160 ms is likewise the same, a distance of 4.4 m is traveled by the vehicle 1 in this period. The times indicated are merely possible delays in connection with data transmission. The computing time required by the systems (driver assistance system 3 and remote control 7) has not as yet been taken into account.

FIG. 4 illustrates how a specified trajectory representing the NOMINAL path 11 may be corrected using the remote control 7. The waypoints/absolute coordinates, which form the specified trajectory in the form of a line and lie in the near future (in the situation image 8 represented by a camera image, which does not have to be an image from a front camera), are transmitted as described above to the remote control 7 and displayed for example on the monitors 9. The user 12 of the remote control 7 is able to monitor the camera image and the plotted waypoints or the trajectory representing the NOMINAL path 11.

In the exemplary embodiment shown in FIG. 4, the driver assistance system 3 meets its system limit, since the temporary boundaries 16 of the drivable part of the road 12 make it difficult for the driver assistance system 3 alone safely to control the vehicle 1 through the construction site shown in FIG. 4. If the operator 12 of the remote control 7 identifies this situation, they can manually input new waypoints/coordinates or a corrected NOMINAL line 17 representing a corrected trajectory into the remote control 7, for example by plotting on a touchscreen (cf. FIG. 5), so as to manage the situation safely and as well as possible.

The manually newly input waypoints/coordinates result in the corrected trajectory 17 represented by the corrected NOMINAL line shown in FIG. 4, to allow driving for example around the temporary boundaries 16. Important points may be taken from this corrected NOMINAL line 17 and sent to the vehicle 1, which may in this way replicate the specified journey defined by the corrected NOMINAL line 17 and travel it independently. These data could be relayed by "car to X" communication to other road users, for further processing. How many points are needed for reconstruction of the corrected trajectory is dependent on the complexity of the line to be traveled. A straight line may for example be determined by two points. The points required for cornering are however dependent on a corresponding curve radius and the expected accuracy.

Thus, the vehicle 1 may be controlled by the remote control 7 on the basis of the corrected trajectory and the received exterior situation image 8, in particular in the form of the camera image. Since the current steering angle of the steering wheel 13 of the remote control 7 does not have in each case to be transmitted, but rather the path to be traveled which lies in the future, slow data links may be compensated to a certain extent.

FIG. 5 illustrates how a corrected trajectory 17 may be plotted into the camera image as the exterior situation image 8 by means of a stylus 18 via a touchscreen 10. During plotting, the camera image may be frozen from the first touch of the stylus 18, and only updated again when the stylus 18 has been removed once again from the touchscreen 10.

Figure 6:
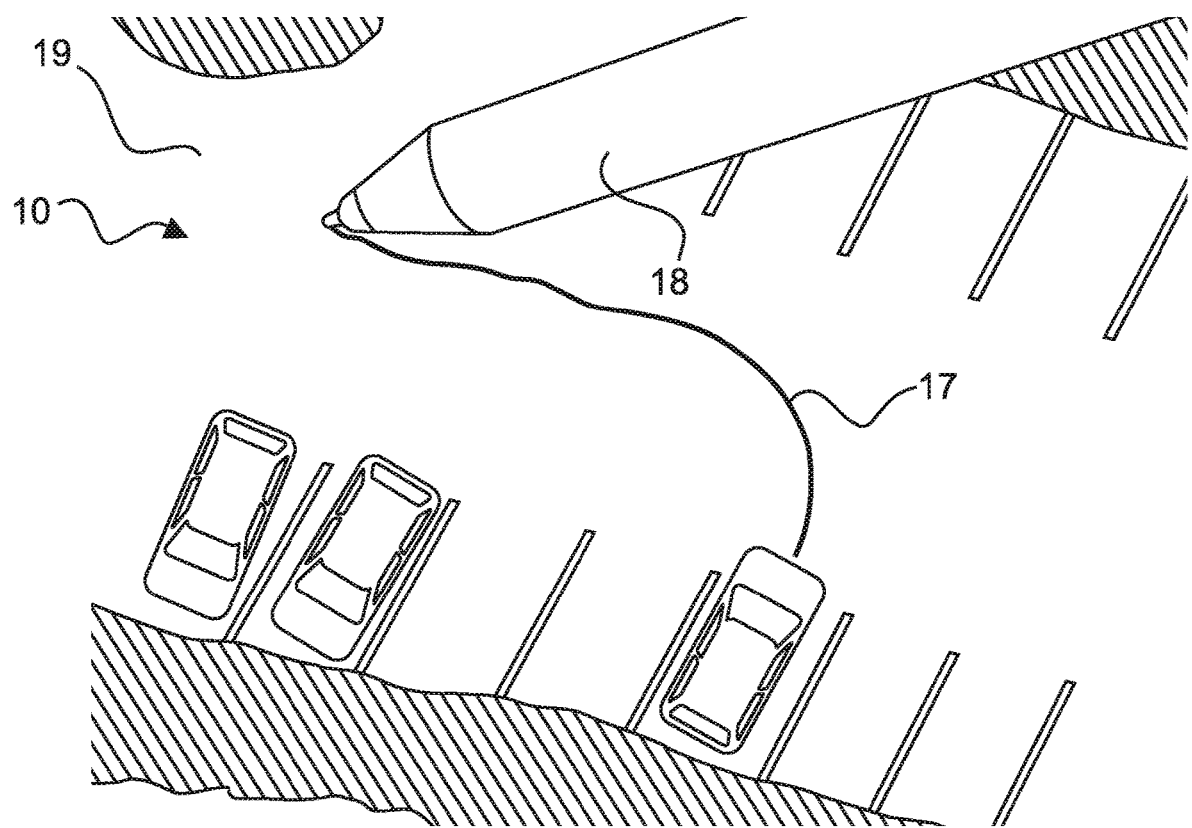
FIG. 6 shows a map illustrated on a touchscreen, which map shows a vehicle and the surroundings thereof, wherein a corrected NOMINAL path can be plotted by means of a stylus.

It is likewise possible according to FIG. 6 for the user 12 of the remote control 7 to plot the corrected trajectory remotely into a map 19 using a stylus 18, wherein, in addition to the map 19, all important information from the sensor system 2, in particular from the camera thereof, is also transferred.

FIG. 1 furthermore illustrates how the vehicle 1 may be controlled as a function of the quality of data transmission between the vehicle 1, in particular the first communication interface 5 of the driver assistance system 3, and the remote control 7, in particular the second communication interface 6 thereof.

In this way, in a step 100 the quality of the available data link between the vehicle 1 and the remote control 7 is continuously determined. If it is established that the determined quality of the data link reaches a predetermined first quality level (result 200), the vehicle 1 may be controlled by means of the steering wheel 13 of the remote control 7 or the plot of the corrected trajectory represented by the corrected NOMINAL line 17 (cf. FIGS. 4 to 6) (step 300). The first quality level may here be selected to be high enough for a sufficiently fast and reliable data link in particular to be called for, which in particular includes a sufficiently short latency for control of the vehicle 1 by means of the steering wheel 13.

If it is established that the determined quality of the data link reaches a predetermined second quality level (result 400), which is below the first quality level, the vehicle 1 may be controlled by means of the plot of the corrected trajectory represented by the corrected NOMINAL line 17 (cf. FIGS. 4 to 6) (step 500) but not by the steering wheel 13 of the remote control 7, because sufficiently fast data transmission for safe control of the vehicle 1 by means of the steering wheel 13 cannot in caste be guaranteed in this case.

If it is established that the determined quality of the data link does not reach the predetermined second quality level (result 600), control of the vehicle 1 is handed over from the remote control 7 to the driver assistance system (step 700). In particular, a hand-over request to a driver of the vehicle 1 may be generated using the driver assistance system 3 after control of the vehicle 1 has been taken over by the driver assistance system 3, wherein a minimal risk maneuver is performed by the driver assistance system 3 if the driver of the vehicle 1 does not take over control of the vehicle 1 after a set period has elapsed since the hand-over request. It is also conceivable that an automatic emergency call may be made in this situation.

The invention claimed is:

1. A method of remotely controlling a vehicle, the method comprising steps:
    creating an exterior situation image for the vehicle using a sensor system that detects surroundings of the vehicle;
    specifying a specified trajectory for the vehicle using a driver assistance system of the vehicle;
    via a wireless data link between the vehicle and a remote control that is arranged spatially separately from the vehicle, wirelessly transmitting the exterior situation image and the specified trajectory from the vehicle to the remote control;
    continuously determining a quality of the wireless data link;
    comparing the quality to a predetermined first quality level and to a predetermined second quality level that is below the predetermined first quality level;
    only when the quality of the wireless data link at least reaches the predetermined first quality level, controlling the vehicle based on remote control data that is generated by the remote control in response to an actuation of an operating element of the remote control by a human operator, and that is transmitted from the remote control to the vehicle via the wireless data link; and
    only when the quality of the wireless data link at least reaches the predetermined second quality level, controlling the vehicle based on a remotely corrected trajectory that is generated by the remote control and differs from the specified trajectory, and that is transmitted from the remote control to the vehicle via the wireless data link.

2. The method according to claim 1, further comprising transmitting a supplementary image of the surroundings of the vehicle to the remote control, and wherein the generating of the remotely corrected trajectory in the remote control is based on the exterior situation image and the supplementary image.

3. The method according to claim 1 further comprising transferring control of the vehicle from the remote control to the driver assistance system when the quality of the wireless data link falls below the predetermined second quality level.

4. The method according to claim 3, further comprising generating a hand-over request to a driver of the vehicle by the driver assistance system after the transferring of the control of the vehicle to the driver assistance system, and performing a minimal risk maneuver by the driver assistance system when the driver of the vehicle has not taken over control of the vehicle after a set time period has elapsed since the hand-over request was generated.

5. The method according to claim 1, further comprising establishing a communication link between a driver of the vehicle and the human operator of the remote control.

6. The method according to claim 1, comprising the controlling of the vehicle based on the remote control data.

7. The method according to claim 6, wherein the controlling of the vehicle is performed by the driver assistance system of the vehicle based on the remote control data.

8. The method according to claim 6, further comprising displaying the exterior situation image and the specified trajectory to the human operator of the remote control.

9. The method according to claim 1, comprising the controlling of the vehicle based on the remotely corrected trajectory.

10. The method according to claim 9, wherein the generating of the remotely corrected trajectory in the remote control is based on inputs by the human operator of the remote control.

11. The method according to claim 1, further comprising controlling the vehicle by a human driver of the vehicle or by the driver assistance system, not based on the remote control data and not based on the remotely controlled trajectory, when the quality of the wireless data link falls below the predetermined second quality level.

12. A system for remotely controlling a vehicle, the system comprising a remote control that is arranged spatially separately from the vehicle, and is configured:
    to wirelessly receive from the vehicle, via a wireless data link between the vehicle and the remote control, an exterior situation image for the vehicle and a specified trajectory for the vehicle,
    to continuously determine a quality of the wireless data link,
    to compare the quality to a predetermined first quality level and to a predetermined second quality level that is below the predetermined first quality level,
    only when the quality of the wireless data link at least reaches the predetermined first quality level, to control the vehicle based on remote control data that is generated by the remote control in response to an actuation of an operating element of the remote control by a human operator, and that is transmitted from the remote control to the vehicle via the wireless data link, and
    only when the quality of the wireless data link at least reaches the predetermined second quality level, to control the vehicle based on a remotely corrected trajectory that is generated by the remote control and differs from the specified trajectory, and that is transmitted from the remote control to the vehicle via the wireless data link.

* * * * *